United States Patent
Sagar et al.

(10) Patent No.: US 12,450,482 B2
(45) Date of Patent: Oct. 21, 2025

(54) SAMPLE DATA GENERATION FOR A MOCKING SERVICE

(71) Applicant: Salesforce, Inc., San Francisco, CA (US)

(72) Inventors: Gaurav Sagar, Bellevue, WA (US); Antonio Garrote, San Francisco, CA (US); Patricio Barletta, Brentwood, CA (US); Javier Isoldi, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 670 days.

(21) Appl. No.: 17/822,065

(22) Filed: Aug. 24, 2022

(65) Prior Publication Data
US 2024/0070448 A1  Feb. 29, 2024

(51) Int. Cl.
*G06N 3/08* (2023.01)
*G06F 9/54* (2006.01)

(52) U.S. Cl.
CPC ............... *G06N 3/08* (2013.01); *G06F 9/54* (2013.01)

(58) Field of Classification Search
CPC .................................... G06N 3/08; G06F 9/54
See application file for complete search history.

(56) References Cited

U.S. PATENT DOCUMENTS

| | | | | |
|---|---|---|---|---|
| 10,382,799 | B1* | 8/2019 | Walters | G06F 21/552 |
| 10,901,815 | B2* | 1/2021 | Chen | G06N 3/063 |
| 2020/0104156 | A1* | 4/2020 | Cella | G06F 16/27 |
| 2020/0294139 | A1* | 9/2020 | Cella | H04L 9/50 |
| 2021/0192175 | A1* | 6/2021 | Pineda | G06V 10/772 |
| 2021/0358032 | A1* | 11/2021 | Cella | G06F 16/2379 |
| 2022/0138558 | A1* | 5/2022 | Kapoor | G06N 3/08 |
| | | | | 706/25 |
| 2022/0291666 | A1* | 9/2022 | Cella | B25J 9/163 |
| 2024/0070448 | A1* | 2/2024 | Sagar | G06F 9/54 |

* cited by examiner

*Primary Examiner* — David E Choi
(74) *Attorney, Agent, or Firm* — Holland & Hart LLP

(57) ABSTRACT

Methods, systems, apparatuses, devices, and computer program products are described. A mocking service may log a set of real application programming interface (API) data including a set of API requests and corresponding API responses. Using a generator function of a generative adversarial network (GAN), the mocking service may generate a set of sample (e.g., mock) data that mimics the API requests and responses. The mocking service may use a discriminator function to compare the sample data to the real API data and weight parameters of the GAN (e.g., retrain a machine learning model of the GAN) until the generator function generates sample data similar enough to the real API data. When the discriminator function is unable to distinguish the sample data, the real data, the mocking service may store the trained GAN and use it to generate mock API responses to API requests from users.

20 Claims, 12 Drawing Sheets

SAMPLE DATA GENERATION FOR A MOCKING SERVICE

FIELD OF TECHNOLOGY

The present disclosure relates generally to data processing, and more specifically to sample data generation for a mocking service.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant data processing system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may interface with one or more databases, application programming interfaces (APIs), or web services. For example, the cloud platform may interface with a mocking service used to test functionalities and API calls associated with an API.

DETAILED DESCRIPTION

Figure 1:
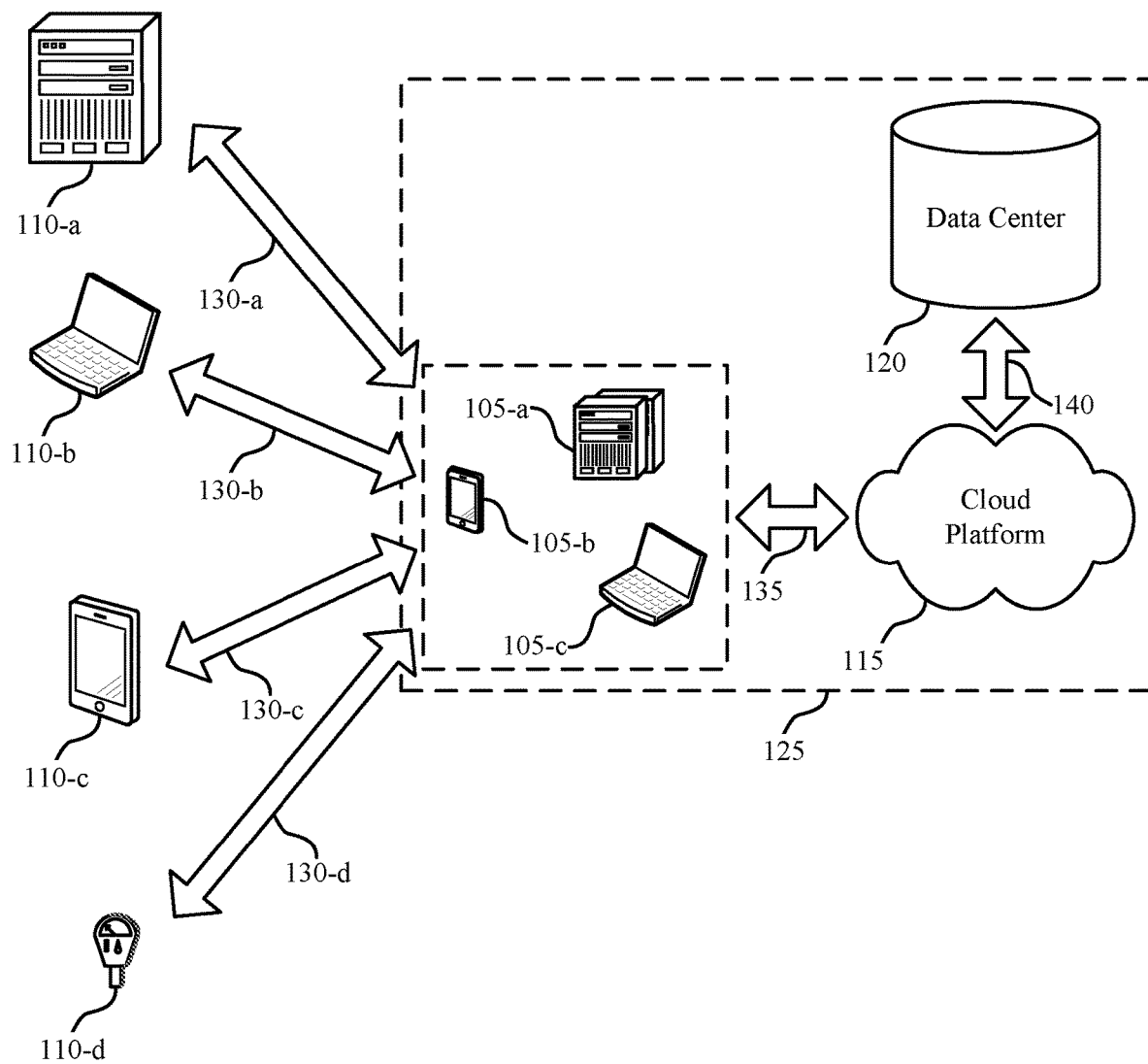
FIG. 1 illustrates an example of a data processing system that supports sample data generation for a mocking service in accordance with aspects of the present disclosure.

Some software applications may retrieve data from multiple data sources. For example, an application that provides the status of an online purchase may retrieve data from a first data source that includes shipping information related to the online purchase, a second data source that includes order status information related to the online purchase, and a third data source that includes details related to the item being purchased. The application may interface with these data sources via one or more application programming interfaces (APIs). In some examples, one or more of the data sources may be examples of source APIs, databases, or other types of data sources. Conventional techniques for retrieving data from source APIs (or other data sources) involve querying individual sources and merging or linking fields via hard-coded relationships.

A mocking service may be used to simulate the behavior or an API specification for development and testing purposes. In addition, a mocking service may be used to demo API functionality to customers, partners, and stakeholders. In some cases, a user of the mocking service may provide static examples of input data (e.g., API requests) and responses for the mocking service to use. However, such user-provided example data may be limited in utility and quantity as it may not be real data, and as it is manually provided by the user. To account for utility, a user (e.g., a developer) may provide real data from a live API as examples to the mocking service, however, that may risk exposing real data that is required to be confidential (such as personal identification information (PII) data), violating government laws and/or internal compliance policies, or both. To account for the limited quantity of example data, a user may use a fake data-generating library (e.g., faker.js) to generate fake data for the various fields in the request and response body of the API. However, the examples generated from fake data generation libraries may be unable to produce enough data samples, lack diversity, fail accurately mimic real data in terms of a relationship between the various fields in the request and response of the API, or any combination thereof. As such, downstream APIs and integrations developed and tested based on examples from such a mocking service may be prone to failure.

One or more aspects of the present disclosure provide techniques for generating sample data from a mocking service instead of relying solely on existing fake data generation libraries (e.g., faker.js). In some examples, a mocking service may log real API requests and corresponding responses of an API running in production. The mocking service may support a generative adversarial network (GAN) including a first machine learning model associated with a generator function and a second machine learning model associated with a discriminator function. In some examples, the mocking service may use the generator function to generate a set of sample data based on an output of the first machine learning model, where the set of sample data may be configured to mimic (e.g., mock) the API requests and responses. Additionally, the mocking service may train the GAN based on a discriminator function comparing the set of sample data with the data including API requests and responses from the actual API. When the discriminator function is unable to distinguish the set of sample data (e.g., the mock data) generated by the generator function from the real data generated by the actual API, the GAN may be considered as fully trained. Accordingly, the mocking service may store the trained version of the GAN, which a user may invoke to generate sample data on the fly (e.g., the set of sample data may be returned to the user as a response to the API request).

Aspects of the disclosure are initially described in the context of an environment supporting an on-demand database service. Aspects of the disclosure are then described in the context of computing architectures, GANs, and process flows. Aspects of the disclosure are further illustrated by and described with reference to apparatus diagrams, system diagrams, and flowcharts that relate to sample data generation for a mocking service.

FIG. 1 illustrates an example of a system 100 for cloud computing that supports sample data generation for a mocking service in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

One or both of the cloud platform 115 or the subsystem 125 may support a server, such as a mocking server, which may host an API mocking service. In some cases, the server may include aspects of an application server as described herein. The mocking service may support secure, efficient API testing and validating. The mocking service may expose an endpoint of the API to a user, which may be an example of a cloud client 105 or a contact 110. The user may be an example of a tenant of the mocking server. The user may use the endpoint to test the API prior to full implementation (e.g., publishing) of the API. The testing may be based on an API specification and its underlying metadata. An API specification may refer to a document or program that defines at least a portion of the functionality of an API (e.g., including any combination of behaviors, definitions, documentation, etc., for the API). The user may validate whether the API is functioning properly and troubleshoot any problems with the API based on results of the mocking service.

In some other systems, a mocking service may be used to test functionalities and API calls associated with an API. For example, a mocking service may be used to demo API functionalities to customers, partners, and stakeholders based on user-provided static examples of API requests and corresponding responses. However, as such user-provided example data may not be real data, the example data may be limited in utility. That is, the mocking service may be unable to use the example data for some mock implementations. Additionally, a user of the mocking service may manually provide the example data, and as such, the example data may be limited in quantity.

In some cases, a live API may not have a corresponding API specification (e.g., a document or program that defines at least a portion of the functionality of an API). If no mocking API is present for this live API, a user (e.g., a developer) who may want to test downstream APIs that use this API and build, test, and debug other integrations may create some static examples of the API request and the API responses, and use these mock examples in a mocking service. However, such examples, being manually created may be limited in quantity, thus lacking usefulness for downstream API integration and testing. Additionally, even if the user uses a fake data-generation library (e.g., faker.js) to generate random mock data without manually creating them, the mock data may lack diversity in terms of what types of data that may appear in real API calls, along with missing out on relationships that may exist between the various fields of the real API. The user may have an option to use the live API rather than using mock data from the mocking service, however, the user may refrain from using live APIs, as live APIs may run in production servers and may have real impact to a business if errors occur during integration testing and similar procedures. As such, a user may use a mocking service, leaving a downstream API or integration prone to failure at launch (e.g., as the integration testing may be incomplete or result in errors). Additionally, a user may want to demo the functionality of an API to stakeholders or prospective customers. The demo may still rely on a mocking service instead of a live API, as the live API may risk exposing real customer data to unauthorized users. The demo on the mocking service may be unsuccessful, however, as the mock data may fail to resemble real live API data the demo audience may be expecting.

To enhance functionality of a mocking service, the system 100 may support generating sample data for a mocking service instead of relying solely on existing fake data generation libraries (e.g., faker.js) for creating and testing downstream APIs and integrations. In some examples, a mocking service (e.g., corresponding to the cloud platform 115) may include a logging service, a GAN including machine learning models corresponding to a generator function and a discriminator function, and a mocking service, among other components. In some examples, the logging service may log real API requests and corresponding responses of an API running in production. In some examples, a first machine learning model including the generator function may generate a set of sample data based on an output of the first machine learning model. The set of sample data may be a set of mock or example data that is configured to mimic (e.g., mock) the API requests and responses.

In some examples, a discriminator function of a second machine learning model may compare the set of sample data with the data including API requests and responses from the API in production (e.g., the actual API). Based on the comparison, the mocking service may train (e.g., weight parameters of) the GAN such that the generator function may generate more realistic sample data, and may also train the discriminator function to become better at distinguishing between mock and real data generated by the actual API (e.g., examples from the live API in production). Such training may continue for both the generator and the discriminator until the discriminator is unable to distinguish the set of sample data generated by the generator function from the real data (e.g., because the sample data highly resembles the real data beyond a statistical threshold), the GAN may be considered fully trained. Accordingly, the mocking system may store the trained version of the GAN (e.g., in a data center 120), which a user may invoke to generate sample data at a given time (e.g., the set of sample data may be returned to the user as a response to the API request).

Generating the set of sample data for the mocking service may provide enhanced functionality of the system 100, when running mock implementations of APIs. For example, the discriminator function may retrain the GAN and compare generated mock data to a set of real API requests and corresponding API responses until the mock and real data generated by the actual API are indistinguishable. Thus, the mocking service may ensure that the set of mock data is sufficient in quantity and quality for downstream API development, testing, and integration, which may help with the downstream API development, testing, and integration process. In addition, the GAN may generate and iterate the set of sample data without using an API specification, which may allow for developing a mocking service or these API To improve downstream API development, testing, and integration processes and reduce changes of bugs that may lead to downstream API or integration failure. Moreover, the described techniques may enable the mocking service to anonymize the set of sample data associated with personal identification information (PII), which may result in increased security of the downstream APIs.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
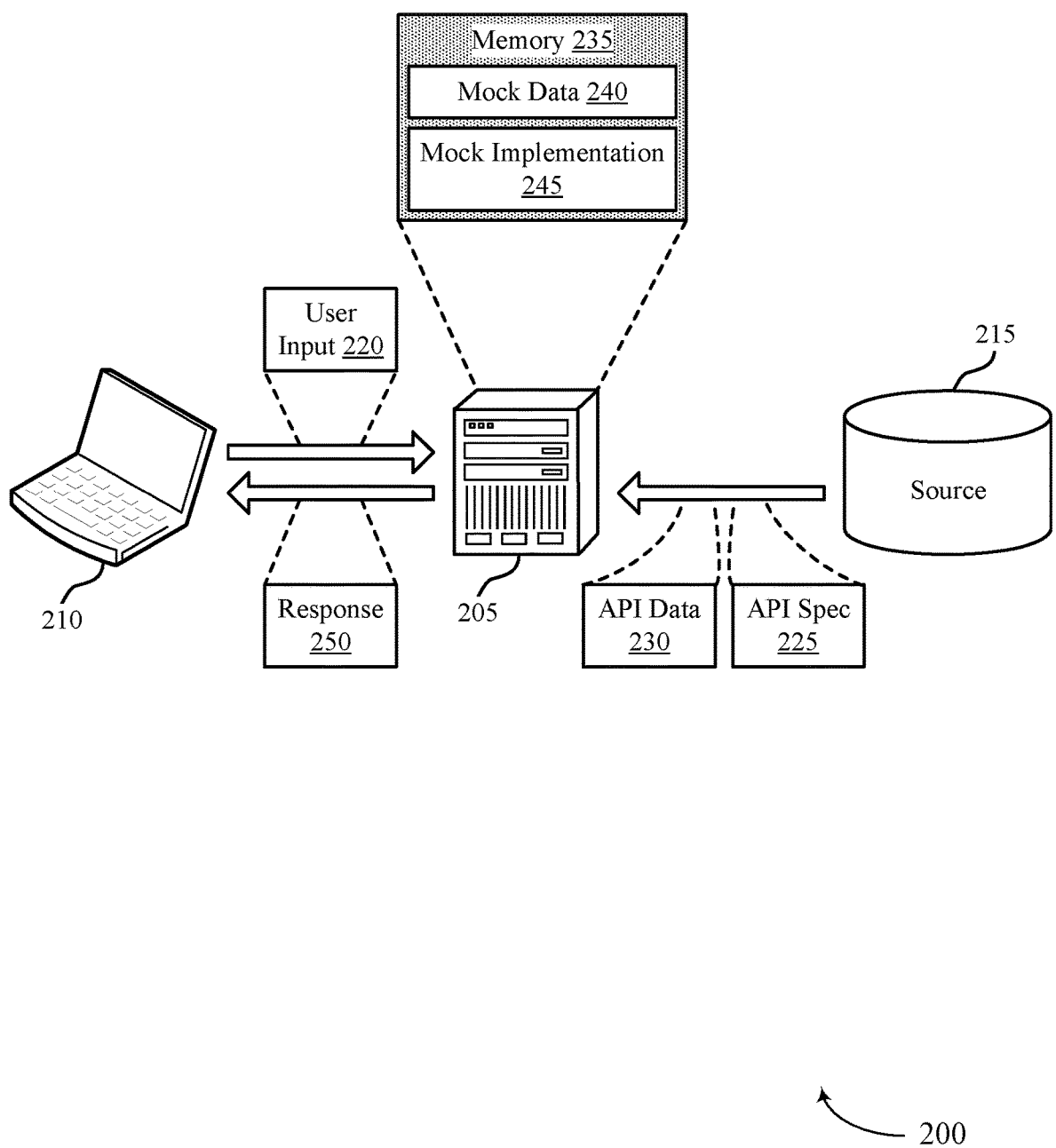
FIGS. 2 and 3 illustrate examples of computing architectures that support sample data generation for a mocking service in accordance with aspects of the present disclosure.

FIG. 2 illustrates an example of a computing architecture 200 that supports sample data generation for a mocking service in accordance with aspects of the present disclosure. The computing architecture 200 may implement or be implemented by aspects of the data processing system 100. For example, the computing architecture 200 may include a server 205, which may be implemented by aspects of a cloud platform 115 or a subsystem 125 described with reference to FIG. 1. The server 205 may be an example of a mocking server or an application server, and may be a single server, a server cluster, a container, a virtual machine, or any other device or system for running mock implementations 245 of or API data 230.

The server 205 may receive information from a user device 210 (e.g., via a user interface or a machine-to-machine data transfer) to generate mock data 240 (e.g., sample data, example data), and execute mock implementations 245. Additionally, in some cases, the server 205 may retrieve the API data 230 from a source 215. A source 215 may be an example of an internal repository to the server 205 or a system served by the server 205, an external repository to the server 205, a shared code repository, a file upload, a database, a data store, a cloud-based storage entity, or some combination of these or other storage systems. In some cases, the server 205 or user device 210 may operate as the source 215 for an API specification 225 or the API data 230. The API specification 225 may include a document or program that defines at least a portion of the functionality of an API (e.g., including any combination of behaviors, definitions, documentation, etc., for the API), and the API data 230 may include a set of API requests and a corresponding set of API responses.

The computing architecture 200 may support secure, efficient API testing and validation. For example, a user operating the user device 210 may use the mocking service to simulate responses to an API in order to test that the API is functioning properly, troubleshoot problems, demo the API, implement and test downstream APIs and integrations with an application, or any combination thereof. In some examples, the server 205 may support a mapping service, a mocking service, or some other service that may be used to generate the mock data 240 and execute the mock implementations 245. The server 205 may store the mock data 240 and the mock implementations 245 in a memory 235. Alternatively, the mock data 240 and the mock implementations 245 may be stored in some external data store. In some cases, the server 205 may generate a mock implementation 245 for an API based on the API data 230, which may detail features, processes, and functions of the API (e.g., a downstream API). In addition, the server 205 may use the API data 230 to inform the mock data 240, which may include mock API responses to a set of API requests.

In some cases, the server 205 may include a mapping service that may generate a mapping between a set of API fields of the API data 230 to a set of fields of an MCL, where the mapping may enable the server 205 to generate values of the mock data 240 into the API fields. Alternatively, the server 205 may support a modeling service including a GAN. The modeling service may use a set of machine learning models included in the GAN to generate the mock data 240, which may mimic a set of API responses to a set of API requests of the API data 230. In this way, the server 205 may use the mock data 240 for a mock implementation 245, which may, increase workflow efficiencies, and increase the efficacy and accuracy of the mock implementation 245.

Running the mock implementation 245 based on the mock data 240 may result in a response 250. The response 250 (e.g., a mock API response, a sample API response), may simulate one or more API responses to one or more API requests. As such, the response 250 may be based on information in the API data 230 (e.g., API requests and corresponding API parameters). That is, in some examples, the response 250 may correspond to a set of values of mock data generated into a set of API fields of an API. Alternatively, the response 250 may include mock API responses corresponding to one or more API requests of the API data 230, such that the response 250 mimics one or more API responses of the API data 230. In some examples, the server 205 may retrieve data included in the response 250 from the memory 235 or some other data store for transmission to the user device 210 based on receiving a request from the user (e.g., via the user input 220). The user device 210 may display the response 250 via a user interface. Based on the response 250 displayed via the user interface, the user may determine how to modify an API, an API specification 225, the API data 230 (e.g., an API request), or any combination thereof.

In some examples, the computing architecture 200 may support sample data generation for the server 205 (e.g., a mocking service), such that a mocking service may use the mock data 240 for machine learning model training or other data analytics procedures. In some examples, the server 205, which may be a mocking service, may include a logging service, a GAN including machine learning models corresponding to a generator function and a discriminator function, and a mocking service, among other components. In some examples, the logging service may log real API requests and corresponding responses of an API running in production. That is, the logging service may log the API data 230, which may include a set of real API requests and a corresponding set of API responses. In some examples, a first machine learning model including the generator function may generate the mock data 240 (e.g., a set of sample data) based on an output of the first machine learning model. The mock data 240 may be configured to mimic (e.g., mock) the API responses when provided the set of API requests of the API data 230.

In some examples, the server 205 may train the GAN (e.g., by weighting one or more parameters of the GAN) based on comparing the mock data 240 with the set of API requests and the set of API responses (e.g., data including API requests and corresponding resources from the real API data 230). The discriminator function may compare the mock data 240 and the set of real API requests and responses, and based on the comparison, the server 205 may train (e.g., weigh parameters of) the GAN such that the generator function may generate more realistic sample data, and train the discriminator function such that the discriminator function becomes better at distinguishing between mock data and real data (e.g., examples from a live API in production). The training may continue for both the generator function and the discriminator function until the discriminator function is unable to distinguish the mock data 240 generated by the generator function from the real API data 230, at which point the GAN may be trained. Accordingly, the server 205 may store the trained version of the GAN, which a user may invoke to generate mock data 240 at a given time (e.g., the set of sample data may be returned to the user as a response to the API request). Other techniques for generating mock data 240 at the server 205 are contemplated within the scope of the present disclosure.

Figure 3:
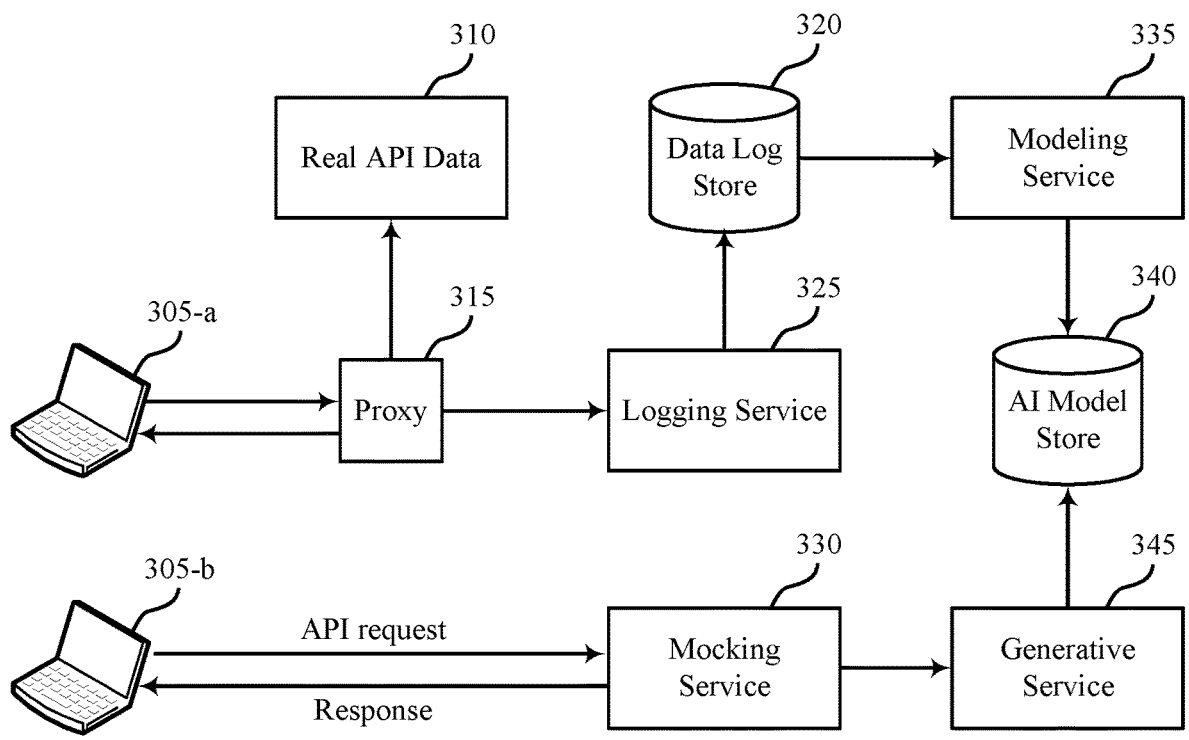

FIG. 3 illustrates an example of a computing architecture 300 that supports sample data generation for a mocking service in accordance with aspects of the present disclosure. The computing architecture 300 may implement or be implemented by aspects of the data processing system 100 or the computing architecture 200. For example, the computing architecture 300 may include a logging service 325, a mocking service 330, a modeling service 335, and a generative service 345, which may be implemented by aspects of a cloud platform 115 or a subsystem 125 described with reference to FIG. 1, or a server 205 described with reference to FIG. 2. In some examples, one or more of the logging service 325, the mocking service 330, the modeling service 335, and the generative service 345 may be examples of an application server, and may be a single server, a server cluster, a container, a virtual machine, or any other device or system for running mock implementations. In some examples, the systems or servers supporting the logging service 325, the mocking service 330, the modeling service 335, and the generative service 345 may each include computing systems that are logically or physically separated.

The computing architecture 300 may support sample data generation for the mocking service 330, which may enable the generation of sample (e.g., mock, fake) data for use in API integration, development, and testing. In some examples, the computing architecture 300 may include a user 305-a and a user 305-b, which may be examples of contacts 110 described herein with reference to FIG. 1. In addition, the computing architecture 300 may include a proxy 315 at a head of an API in production, for which a mocking service may be generated. The proxy 315 may operate between the user 305-a, which may make one or more API requests, and real API data 310 (e.g., an API in production), which may provide one or more API responses to the one or more API requests. In addition to serving as a gateway for the API requests and corresponding API responses, the proxy 315 may make a copy of each successful API request and response pair (e.g., API responses that have an HTTP response code of 200) and transmit the copies to the logging service 325.

In some cases, the logging service 325 may log the API requests from the user 305-a and corresponding API responses from the real API data 310 (e.g., responses of the API running in production). In some examples, the logging service 325 may log uniform resource identifier (URI) parameters (e.g., query parameters) along with the set of API responses in a data table, which the logging service 325 may store at a data log store 320. Columns of the data table may include the parameters and API field names, and rows of the data table may include corresponding values of the API fields. That is, the logging service 325 may generate a data table including the set of API responses and a set of API request parameters, where a set of multiple columns of the data table may include the set of API request parameters and a set of fields associated with the set of API responses, and where a set of multiple rows of the data table may include values of respective fields corresponding to the set of API requests and the set of API responses. As a one-time request, a user 305-a may review the data table and mark columns that include PII. By logging the data in this way in the data log store 320, the data table may be provided to the modeling service 335 without requiring an API specification.

The modeling service 335 may include a GAN deep learning model, which may include a set of machine learning models used to generate mock API response data for the mocking service 330 (e.g., an artificial intelligence-based mocking service). In some examples, the GAN may include a first machine learning model (e.g., associated with a first artificial neural network (ANN)) that includes a generator function (e.g., a generator), and a second machine learning model (e.g., associated with a second ANN) that includes a discriminator function (e.g., a discriminator). The generator function, operated at the generative service 345 may be a neural network used to generate sample (e.g., mock, fake) data. The discriminator function may be a separate neural network that differentiates real and mock data. The GAN, including the generator function and the discriminator function, is described herein with reference to FIG. 3.

The modeling service 335 may be enacted once the logging service 325 logs enough rows of sample data from the real API data 310 in the data table (e.g., enough rows may be based on predefined rules such as the number of rows being at least 100 times a number of columns. so if there are 12 unique columns in the data table, the logging service 325 may be required to log 1,200 rows of data before the modeling service 335 may be used). Alternatively, a user may provide a value of a sample size for the sample data in the data table. The modeling service 335 may infer a data type (e.g., string, discrete, continuous, categorical, ordinal) of each column of the data table and apply a transformation to each column (e.g., one-hot encoding for categorical columns, a Gaussian transformation, binning, and other examples for continuous and discrete columns).

In some examples, the GAN of the modeling service 335 may be trained on the data table. Using the generator function of the first machine learning model, the modeling service 335 may generate a set of sample data from an output of the first machine learning model, the set of sample data configured to mimic (e.g., mock) the set of API requests and responses. That is, the modeling service 335 may generate the set of sample data from the output of the first machine learning model (e.g., or the generative function) based on training the GAN with the data table. By generating the set of sample data in this way, the generator function may ensure that the sample data includes all properties (e.g., fields) of the real data generated by the actual API stored in the data table based on preserving or maintaining correlations between fields of the real data and the sample data. That is, a given set of fields associated with the sample data may correspond to a given set of fields associated with the set of API requests and the set of API responses.

Using the discriminator function associated with the second machine learning model, the modeling service 335 may compare the set of generated sample data with the set of API requests and the set of API responses. The modeling service 335 may weight one or more parameters of the GAN based on the comparison. Accordingly, the discriminator function may compare the real API data 310 to the sample data generated by the generator function, and may retrain and improve the GAN such that the generator function may generate sample data that has a closer resemblance to the real API data 310. That is, the first and second machine learning models may retrain (e.g., fine tune) themselves based on feedback provided to them such that the generator function may create improved versions of the sample data that look like the real API data 310, and the discriminator function may continue attempting to distinguish the improved versions of the sample data from the real API data 310.

Feedback may be provided to the generator function to fine tune itself in this way until the discriminator function fails to distinguish the sample data generated by the generator function from the real data (e.g., API requests and responses of the real API data 310). At this point, the generator function may create sample data that passes as real API data 310. This may indicate that the GAN (including the first machine learning model and the second machine learning model) is fully trained and thus, may be used to generate sample data that has many similarities to real data. When the GAN is fully trained, the GAN may be serialized and saved in an AI model store 340. That is, the modeling service 335 may save the trained version of the GAN based on the set of sample data and the real API data 310 being indistinguishable.

In some examples, the generative service 345 may unserialize the GAN and provide it as a service such that based on an invocation, the generative service 345 may return a sample of mock generated data. For example, the user 305-b (e.g., an API developer) may invoke the mocking service 330 with an API request (e.g., an API call to the mocking service 330 such as HTTP GET/mocking/patientInfo/), which may trigger the mocking service 330 to call the generative service 345. The generative service 345 may retrieve the trained GAN from the AI model store 340 and use the generator function to generate a set of sample data based on the API request from the user 305-b. In some examples, the generative service 345 may anonymize fields of the sample data, that the user 305-a previous marked to include PII data, with random data from a fake data-generation library (e.g., faker.js). That is, the generative service 345 may anonymize the set of sample data with a set of random data from the fake data-generation library (e.g., a mock collection library) based on the set of sample data including PII (e.g., addresses, social security numbers). Because the sample data (e.g., the output of the first machine learning model) is automatically anonymized in this way, the generative service 345 may limit any issues associated with PII and maintain internal and governmental compliance such as General Data Protection Regulation (GDPR).

The generative service 345 may then return the modified, anonymized sample data back to the mocking service 330. For example, the generative service 345 may return the sample data to the mocking service 330 via a machine-to-machine exchange of data (e.g., one API may call the mocking service 330 multiple times and the generative service 345 may save the sample data in a database), the mocking service 330 may receive the sample data via a user interface (e.g., of a mocking service application), or the like. The mocking service 330 may change the sample data from a tabular format into a different file format (e.g., a JSON object) and return the sample data to the user 305-b as an API response.

The user 305-b may query the mocking service 330 at any time to obtain sample data for a given API request on the fly. That is, the mocking service 330 may support nearly a limitless supply of sample data. To account for possible data drifts over time, and to ensure that generated sample data continues to be as close to real API data 310 as possible, the GAN may continue to re-train itself over time. For example, the logging service 325 may log an updated set of API requests and a corresponding updated set of API responses associated with the API. Based on the updated set of API requests and corresponding responses, the mocking service 330 may reweight one or more parameters of the GAN (e.g., retrain the GAN) to account for any changes in the updated set of API requests and responses from the original set. Accordingly, the mocking service 330 may support automatic detection of data drift to initiate retraining of the GAN.

Figure 4:
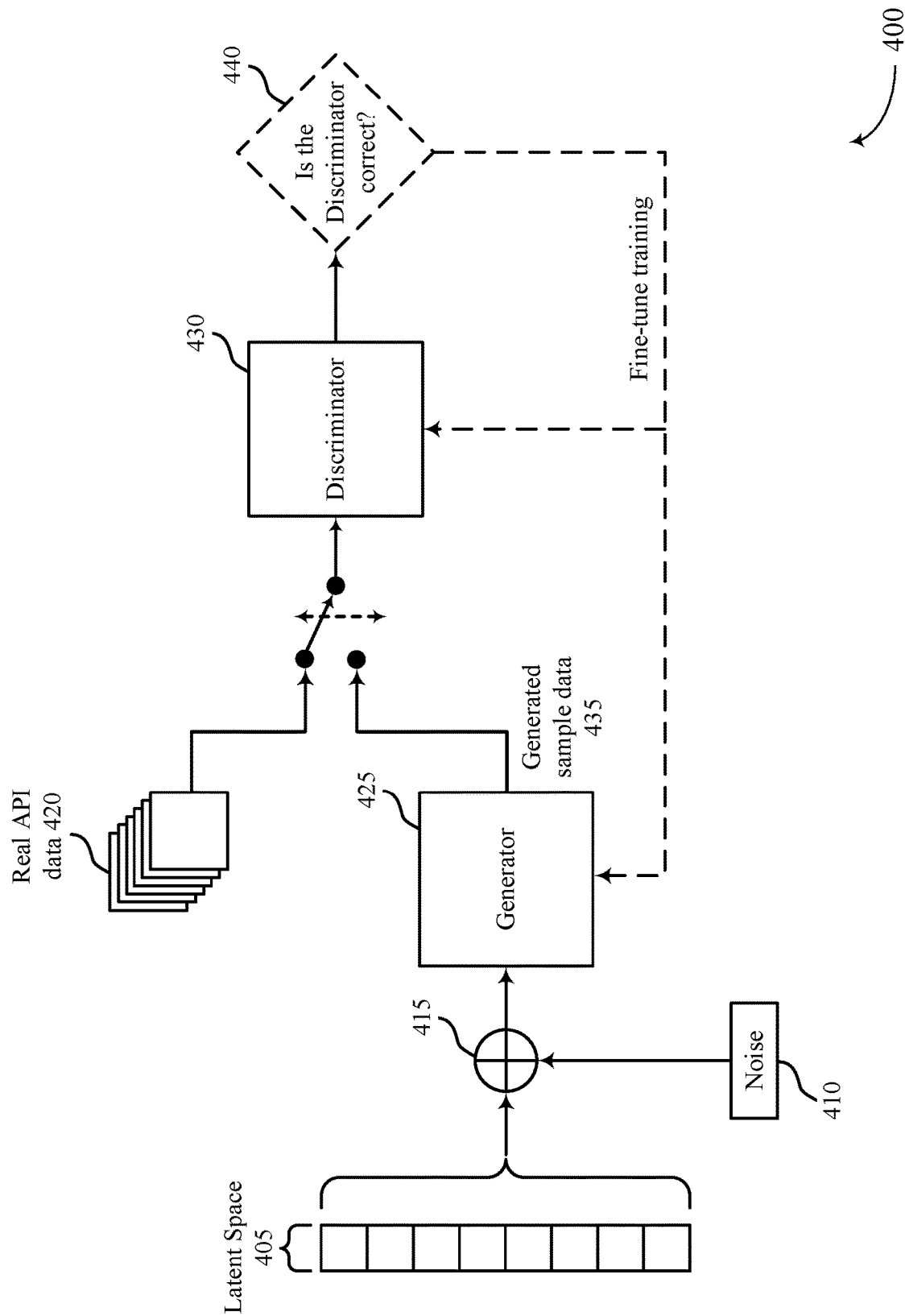
FIG. 4 illustrates an example of a generative adversarial network (GAN) that supports sample data generation for a mocking service in accordance with aspects of the present disclosure.

FIG. 4 illustrates an example of a GAN 400 that supports sample data generation for a mocking service in accordance with aspects of the present disclosure. The GAN 400 may implement or be implemented by aspects of the data processing system 100 or the computing architectures 200 and 300. For example, the GAN 400 may include a generator 425 and a discriminator 430, which may be examples of corresponding devices described herein with reference to FIG. 3. The GAN 400 may be a computing architecture that includes a first machine learning model that supports the generator 425 (e.g., a generative function) and a second machine learning model that supports the discriminator 430 (e.g., a discriminator function). In some examples, the GAN 400 may create sets of sample data (e.g., fake or mock API request and response data) with fields that correlate to fields of real API data 420. In some examples, the systems or servers supporting the generator 425 and the discriminator 430 may each include computing systems that are logically or physically separated.

As described herein, the generator 425 may be a neural network used to generate sample (e.g., mock, fake) data 435. In some examples, a noise vector 410 may be used as a sample from a latent space 405 (e.g., an N-dimensional hypersphere) using a logic 415, where each variable may be drawn from a Gaussian distribution with a mean of zero and a standard deviation of one. The noise vector 410 may be input to the generator 425 (e.g., the first machine learning model), and the generator 425 may use the generator 425 may generate the sample data 435 as an output of the first machine learning model.

In addition, the discriminator 430 may be a separate neural network that may compare the sample data 435 to the real API data 420 and attempt to distinguish the sample data 435 from the real API data 420. The real API data 420 may be input to the discriminator 430 as a table of real API requests and corresponding API responses. For example, the real API data 420 may be input to the discriminator 430 as a data table, where columns of the data table may represent fields associated with the set of API responses and rows of the data table may represent respective field values (e.g., a "patientID" field may correspond to a field value "ABXU0012AD"). As described with reference to FIG. 3, the data in the data table may be transformed to be ingestible by the discriminator (e.g., string data types may become categorical).

The discriminator 430 may compare the sample data 435 output from the generator 425 to the real API data 420, for example using a logic 440 (e.g., an ANN model for binary classification). The logic 440 may indicate whether the discriminator 430 (e.g., "D") is correct in distinguishing the sample data 435 from the real API data 420. If the discriminator 430 correctly distinguishes between the sample data 435 and the real API data 420, the logic 440 may provide feedback to the generator 425 indicating that the sample data 435 was not similar enough to the real API data 420. Accordingly, the parameters of the first machine learning model may be reweighted (e.g., the first machine learning model may be retrained), and the generator 425 may output new sample data 435 that has a closer resemblance to the real API data 420. In addition, the discriminator 430 may be retrained to become better at detecting fake data from real data generated by an actual API.

The discriminator 430 may compare the new sample data 435 to the real API data 420, and the feedback and retraining cycle may continue until the discriminator 430 fails to identify the sample data 435 from the real API data 420 (e.g., until the sample data 435 passes as real API data 420). Put another way, the GAN 400 may be determined to be fully trained when the discriminator 430 becomes relatively poor at distinguishing the sample data 435 from the real API data 420.

In some examples, the fully-trained GAN may be serialized and saved in an AI model store based on the sample data 435 and the real API data 420 being indistinguishable by the discriminator 430. If a user transmits an API request to a mocking service, the mocking service may invoke the generator 425 to generate some sample data based on the API request, where the generated sample data may include mock API responses corresponding to the API request.

Figure 5:
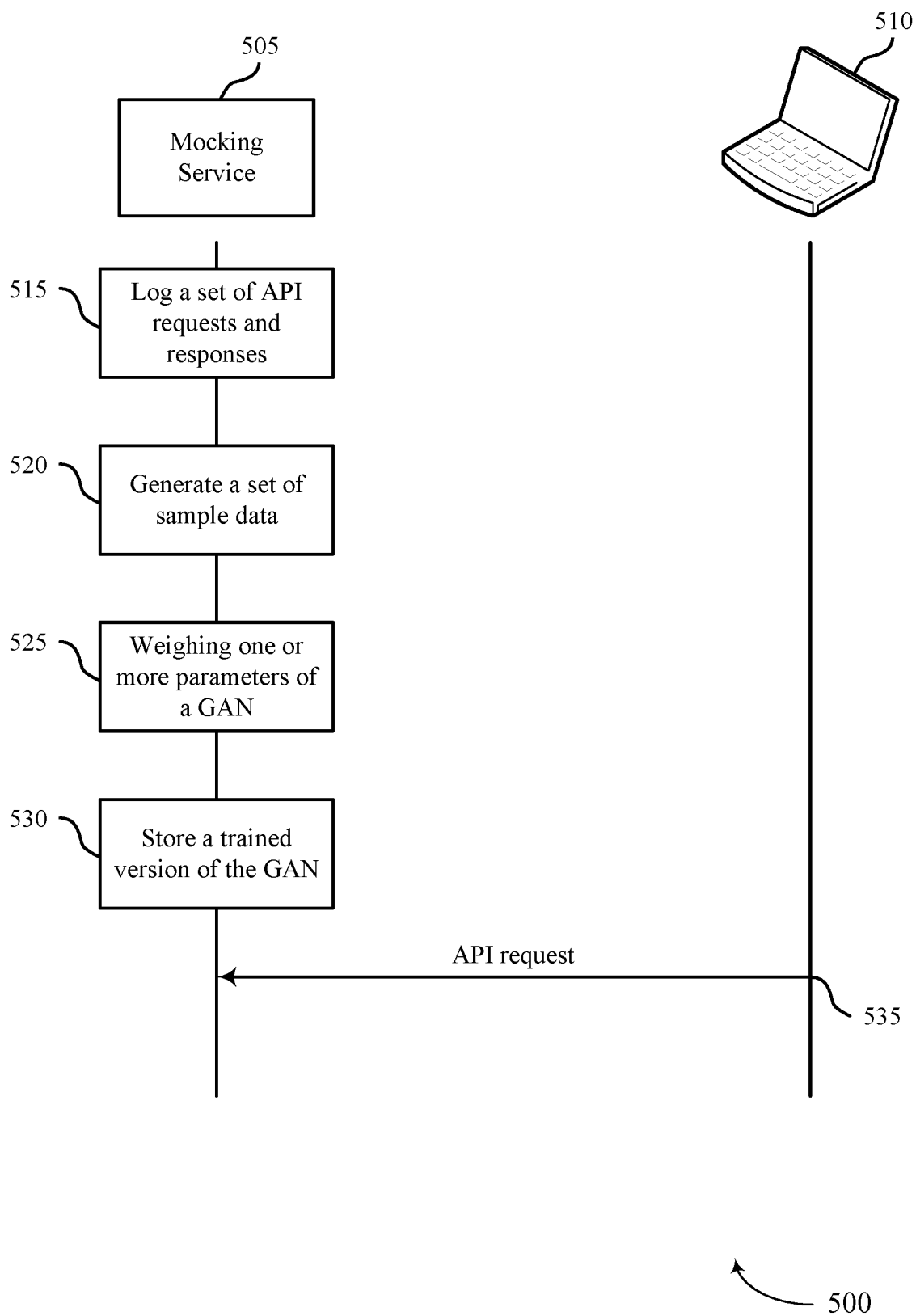
FIG. 5 illustrates an example of a process flow that supports sample data generation for a mocking service in accordance with aspects of the present disclosure.

FIG. 5 illustrates an example of a process flow 500 that supports sample data generation for a mocking service in accordance with aspects of the present disclosure. The process flow 500 may implement or be implemented by aspects of the data processing system 100 or the computing architecture 200. For example, the process flow 500 may include a mocking service 505 and a user device 510, which may be examples of corresponding services and platforms described with reference to FIGS. 1 and 2. In the following description of the process flow 500, operations between the mocking service 505 and the user device 510 may be performed in a different order or at a different time than as shown. Additionally, or alternatively, some operations may be omitted from the process flow 500, and other operations may be added to the process flow 500. The process flow 500 may support techniques for sample data generation for the mocking service 505.

At 515, the mocking service 505 may log a set of API requests and a corresponding set of API responses associated with an API. In some examples, the mocking service 505 may generate a table of the set of API requests and corresponding API responses (e.g., real API data), where columns of the table may represent fields associated with the set of API requests and API responses and rows of the table may represent respective field values.

At 520, the mocking service 505 may generate, using a generator function of a first machine learning model, a set of sample data from an output of the first machine learning model that is configured to generate samples that mimic the set of API responses when given the set of API requests. That is, the mocking service 505 may use the generator function to generate sample (e.g., mock, fake) API responses to given API requests, where the generator function may use random data (e.g., noise vector) as an input.

At 525, the mocking service 505 may weight one or more parameters of a GAN based at least in part on a comparison, using a discriminator function of a second machine learning model, of the set of sample data with the set of API requests and the set of API responses, where the GAN includes the first machine learning model and the second machine learning model. That is, the mocking service 505 may adjust and retrain the GAN (e.g., a deep learning model architecture including the first and second machine learning models) to increase a similarity between the sample data and the real API responses and requests (e.g., to make the sample data more realistic). The discriminator function may compare the sample data and the real API data and provide feedback to the generator function to continue retraining the GAN and generating improved sample data until the discriminator function is unable to distinguish between the sample data and the real API data.

At 530, the mocking service 505 may store a trained version of the GAN based on weighting the one or more parameters. That is, the mocking service 505 may store the trained version of the GAN based on the discriminator function failing to distinguish between the sample data and the real API data, indicating that the generator function generated very realistic sample data.

At 535, the mocking service 505 may receive from the user device 510 (e.g., from a user or a client), an API request. Based on receiving the API request, the mocking service 505 may retrieve the trained version of the GAN from storage and invoke the generator function to generate sample data that includes mock API responses to the API request.

Figure 6:
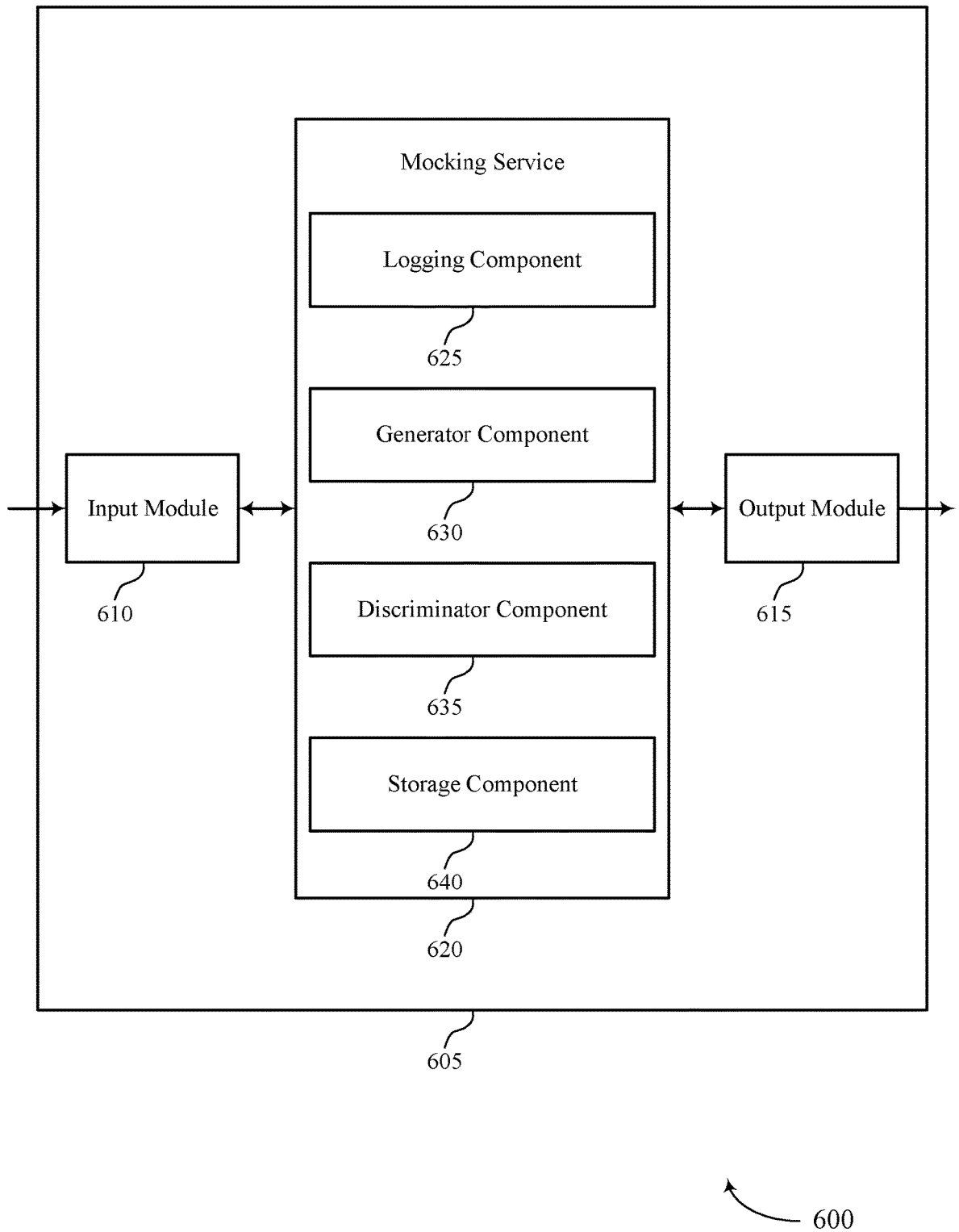
FIG. 6 shows a block diagram of an apparatus that supports sample data generation for a mocking service in accordance with aspects of the present disclosure.

FIG. 6 shows a block diagram 600 of a device 605 that supports sample data generation for a mocking service in accordance with aspects of the present disclosure. The device 605 may include an input module 610, an output module 615, and a mocking service 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the mocking service 620 to support sample data generation for a mocking service. In some cases, the input module 610 may be a component of an I/O controller 810 as described with reference to FIG. 8.

The output module 615 may manage output signals for the device 605. For example, the output module 615 may receive signals from other components of the device 605, such as the mocking service 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the mocking service 620 may include a logging component 625, a generator component 630, a discriminator component 635, a storage component 640, or any combination thereof. In some examples, the mocking service 620, or various components thereof, may be configured to perform various operations (e.g., receiving, monitoring, transmitting) using or otherwise in cooperation with the input module 610, the output module 615, or both. For example, the mocking service 620 may receive information from the input module 610, send information to the output module 615, or be integrated in combination with the input module 610, the output module 615, or both to receive information, transmit information, or perform various other operations as described herein.

The mocking service 620 may support data processing in accordance with examples as disclosed herein. The logging component 625 may be configured as or otherwise support a means for logging a set of API requests and a corresponding set of API responses associated with an API. The generator component 630 may be configured as or otherwise support a means for generating, using a generator function of a first machine learning model, a set of sample data from an output of the first machine learning model that is configured to mimic the set of API responses when given the set of API requests. The discriminator component 635 may be configured as or otherwise support a means for weighting one or more parameters of a GAN based on a comparison, using a discriminator function of a second machine learning model, of the set of sample data with the set of API requests and the set of API responses, where the GAN includes the first machine learning model and the second machine learning model. The storage component 640 may be configured as or otherwise support a means for storing a trained version of the GAN based on the weighting.

Figure 7:
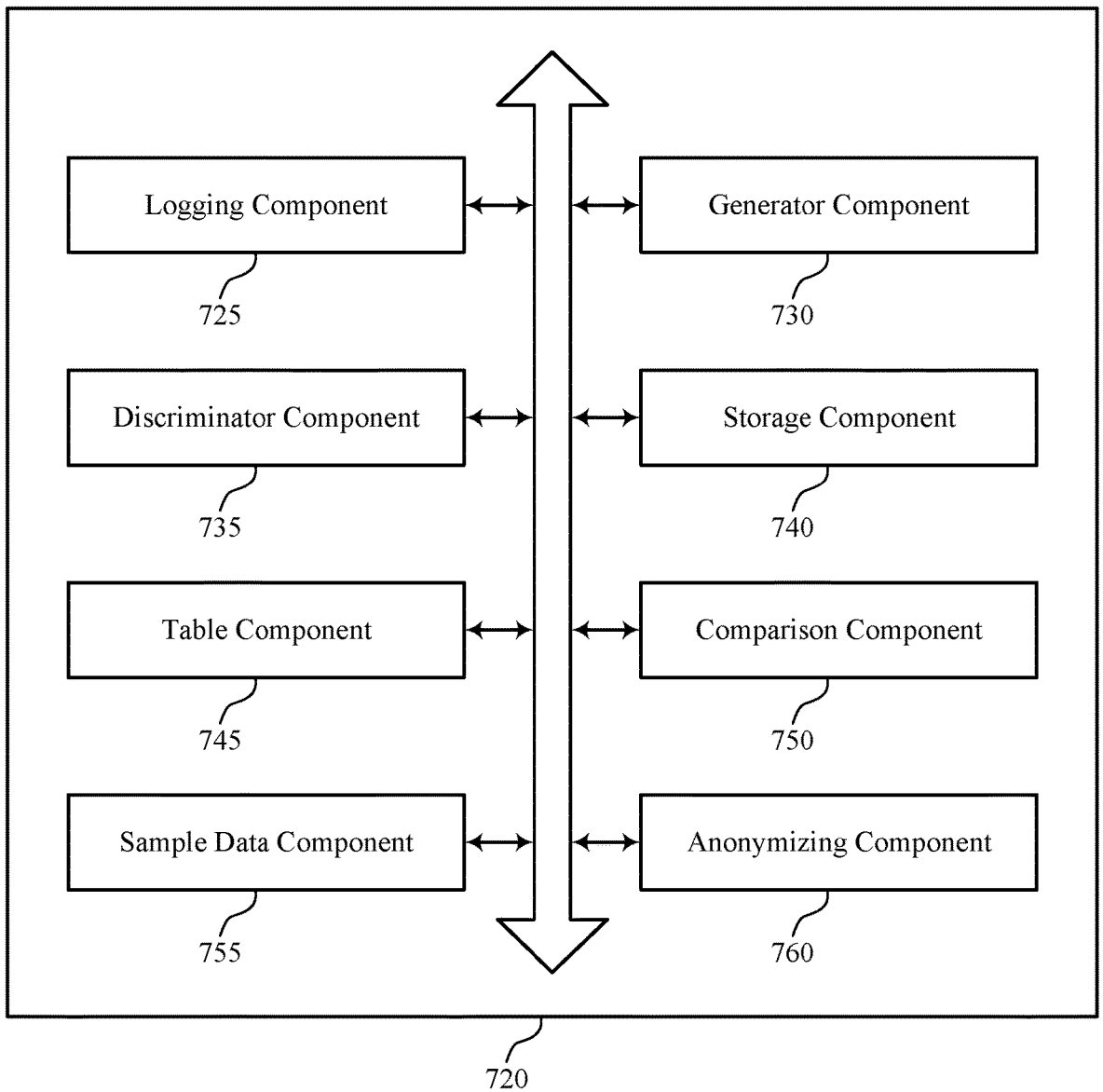
FIG. 7 shows a block diagram of a mocking service that supports sample data generation for a mocking service in accordance with aspects of the present disclosure.

FIG. 7 shows a block diagram 700 of a mocking service 720 that supports sample data generation for a mocking service in accordance with aspects of the present disclosure. The mocking service 720 may be an example of aspects of a mocking service or a mocking service 620, or both, as described herein. The mocking service 720, or various components thereof, may be an example of means for performing various aspects of sample data generation for a mocking service as described herein. For example, the mocking service 720 may include a logging component 725, a generator component 730, a discriminator component 735, a storage component 740, a table component 745, a comparison component 750, a sample data component 755, an anonymizing component 760, or any combination thereof. Each of these components may communicate, directly or indirectly, with one another (e.g., via one or more buses).

The mocking service 720 may support data processing in accordance with examples as disclosed herein. The logging component 725 may be configured as or otherwise support a means for logging a set of API requests and a corresponding set of API responses associated with an API. The generator component 730 may be configured as or otherwise support a means for generating, using a generator function of a first machine learning model, a set of sample data from an output of the first machine learning model that is configured to mimic the set of API responses when given the set of API requests. The discriminator component 735 may be configured as or otherwise support a means for weighting one or more parameters of a GAN based on a comparison, using a discriminator function of a second machine learning model, of the set of sample data with the set of API requests and the set of API responses, where the GAN includes the first machine learning model and the second machine learning model. The storage component 740 may be configured as or otherwise support a means for storing a trained version of the GAN based on the weighting.

In some examples, to support logging the set of API requests and the set of API responses, the table component 745 may be configured as or otherwise support a means for generating a table including the set of API responses and a set of API request parameters, where a set of multiple columns of the table include the set of API request parameters and a set of fields associated with the set of API responses, and where a set of multiple rows of the table include values of respective fields corresponding to the set of API requests and the set of API responses.

In some examples, the table component 745 may be configured as or otherwise support a means for generating the set of sample data from the output of the generator function based on training the GAN with the table.

In some examples, the comparison component 750 may be configured as or otherwise support a means for comparing the set of sample data with the set of API requests and the set of API responses, where storing the trained version of the GAN is based on the set of sample data and the set of API responses being indistinguishable.

In some examples, the generator component 730 may be configured as or otherwise support a means for retrieving the trained version of the GAN from storage. In some examples, the generator component 730 may be configured as or otherwise support a means for generating the set of sample data based on retrieving the trained version of the GAN.

In some examples, the sample data component 755 may be configured as or otherwise support a means for sending, to a mocking service, the set of sample data based on receiving the set of API requests. In some examples, the anonymizing component 760 may be configured as or otherwise support a means for anonymize the set of sample data with a set of random data from a mock library based on the set of sample data including PII.

In some examples, the logging component 725 may be configured as or otherwise support a means for logging an updated set of API requests and a corresponding updated set of API responses associated with the API. In some examples, the discriminator component 735 may be configured as or otherwise support a means for reweighting the one or more parameters of the GAN based on the updated set of API requests and the updated set of API responses. In some examples, a first set of fields associated with the set of sample data corresponds to a second set of fields associated with the set of API requests and the set of API responses.

Figure 8:
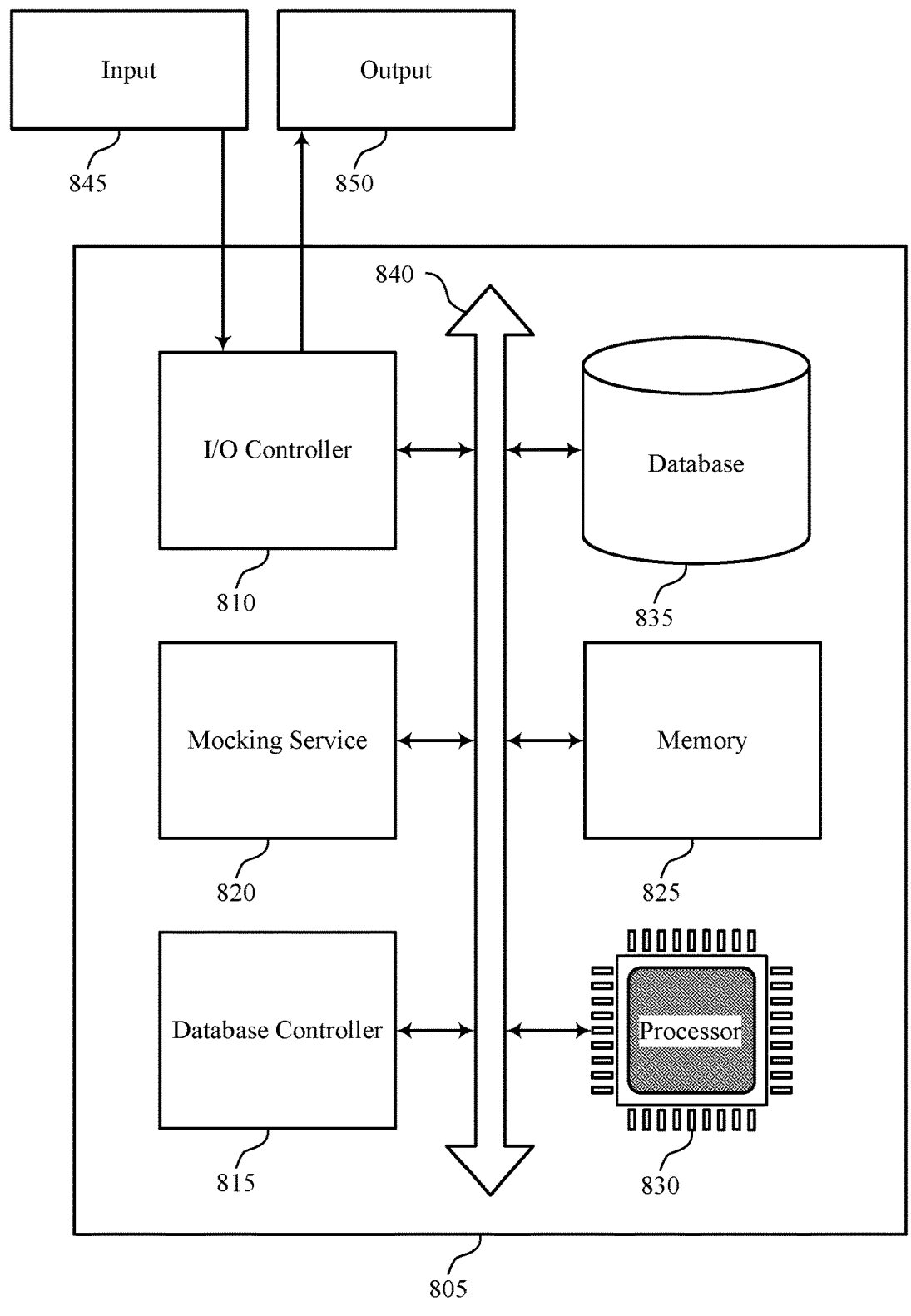
FIG. 8 shows a diagram of a system including a device that supports sample data generation for a mocking service in accordance with aspects of the present disclosure.

FIG. 8 shows a diagram of a system 800 including a device 805 that supports sample data generation for a mocking service in accordance with aspects of the present disclosure. The device 805 may be an example of or include the components of a device 605 as described herein. The device 805 may include components for bi-directional data communications including components for transmitting and receiving communications, such as a mocking service 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting sample data generation for a mocking service).

The mocking service 820 may support data processing in accordance with examples as disclosed herein. For example, the mocking service 820 may be configured as or otherwise support a means for logging a set of API requests and a corresponding set of API responses associated with an API. The mocking service 820 may be configured as or otherwise support a means for generating, using a generator function of a first machine learning model, a set of sample data from an output of the first machine learning model that is configured to mimic the set of API responses when given the set of API requests. The mocking service 820 may be configured as or otherwise support a means for weighting one or more parameters of a GAN based on a comparison, using a discriminator function of a second machine learning model, of the set of sample data with the set of API requests and the set of API responses, where the GAN includes the first machine learning model and the second machine learning model. The mocking service 820 may be configured as or otherwise support a means for storing a trained version of the GAN based on the weighting.

By including or configuring the mocking service 820 in accordance with examples as described herein, the device 805 may support techniques for sample data generation for a mocking service, which may decrease latency, increase API response efficiency, and increase security of mock implementations.

Figure 9:
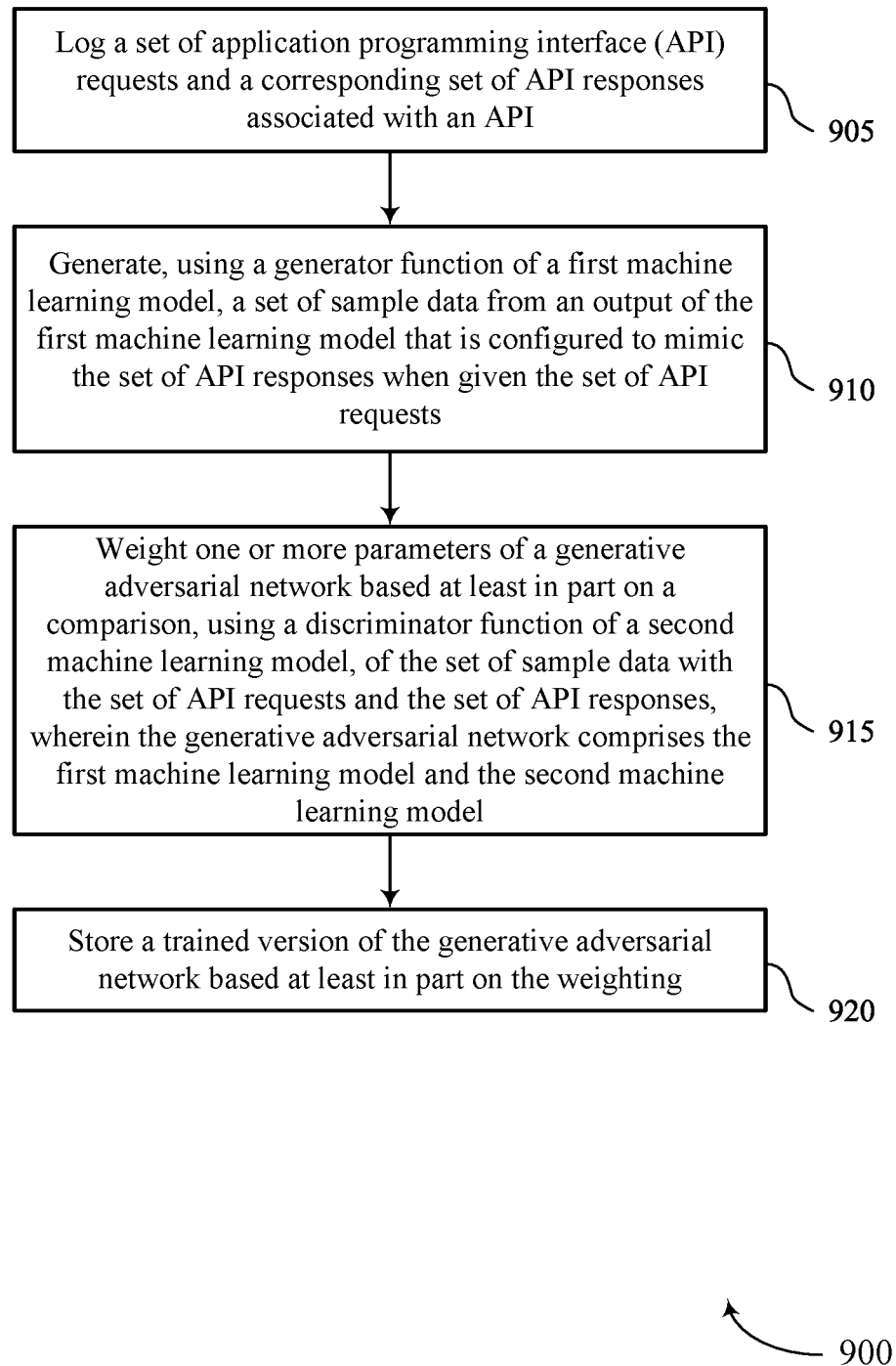
FIGS. 9 through 12 show flowcharts illustrating methods that support sample data generation for a mocking service in accordance with aspects of the present disclosure.

FIG. 9 shows a flowchart illustrating a method 900 that supports sample data generation for a mocking service in accordance with aspects of the present disclosure. The operations of the method 900 may be implemented by a mocking service or its components as described herein. For example, the operations of the method 900 may be performed by a mocking service as described with reference to FIGS. 1 through 8. In some examples, a mocking service may execute a set of instructions to control the functional elements of the mocking service to perform the described functions. Additionally, or alternatively, the mocking service may perform aspects of the described functions using special-purpose hardware.

At 905, the method may include logging a set of API requests and a corresponding set of API responses associated with an API. The operations of 905 may be performed in accordance with examples as disclosed herein. In some examples, aspects of the operations of 905 may be performed by a logging component 725 as described with reference to FIG. 7.

At 910, the method may include generating, using a generator function of a first machine learning model, a set of sample data from an output of the first machine learning model that is configured to mimic the set of API responses when given the set of API requests. The operations of 910 may be performed in accordance with examples as disclosed herein. In some examples, aspects of the operations of 910 may be performed by a generator component 730 as described with reference to FIG. 7.

At 915, the method may include weighting one or more parameters of a GAN based on a comparison, using a discriminator function of a second machine learning model, of the set of sample data with the set of API requests and the set of API responses, where the GAN includes the first machine learning model and the second machine learning model. The operations of 915 may be performed in accordance with examples as disclosed herein. In some examples, aspects of the operations of 915 may be performed by a discriminator component 735 as described with reference to FIG. 7.

At 920, the method may include storing a trained version of the GAN based on the weighting. The operations of 920 may be performed in accordance with examples as disclosed herein. In some examples, aspects of the operations of 920 may be performed by a storage component 740 as described with reference to FIG. 7.

Figure 10:
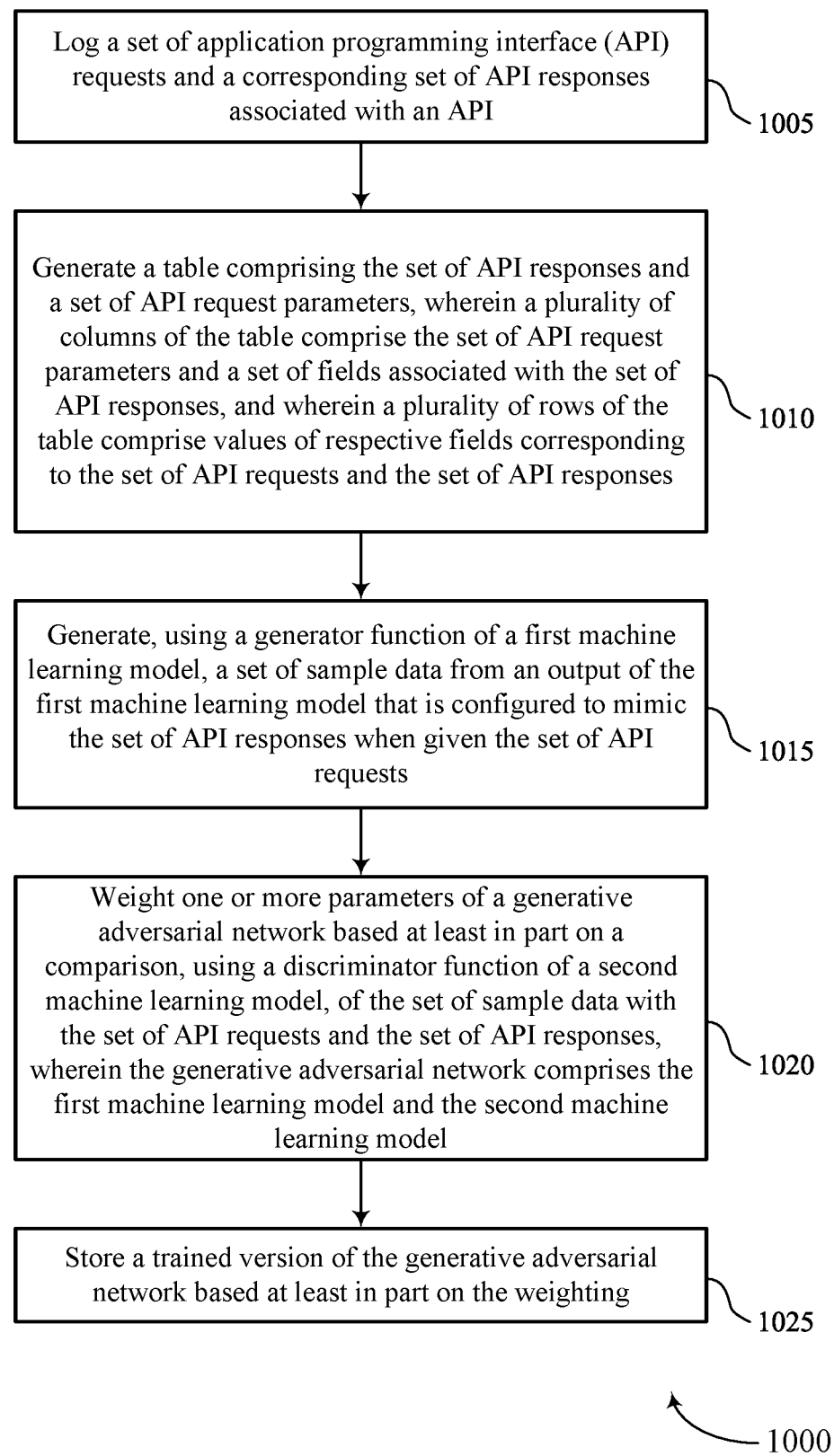

FIG. 10 shows a flowchart illustrating a method 1000 that supports sample data generation for a mocking service in accordance with aspects of the present disclosure. The operations of the method 1000 may be implemented by a mocking service or its components as described herein. For example, the operations of the method 1000 may be performed by a mocking service as described with reference to FIGS. 1 through 8. In some examples, a mocking service may execute a set of instructions to control the functional elements of the mocking service to perform the described functions. Additionally, or alternatively, the mocking service may perform aspects of the described functions using special-purpose hardware.

At 1005, the method may include logging a set of API requests and a corresponding set of API responses associated with an API. The operations of 1005 may be performed in accordance with examples as disclosed herein. In some examples, aspects of the operations of 1005 may be performed by a logging component 725 as described with reference to FIG. 7.

At 1010, the method may include generating a table including the set of API responses and a set of API request parameters, where a set of multiple columns of the table include the set of API request parameters and a set of fields associated with the set of API responses, and where a set of multiple rows of the table include values of respective fields corresponding to the set of API requests and the set of API responses. The operations of 1010 may be performed in accordance with examples as disclosed herein. In some examples, aspects of the operations of 1010 may be performed by a table component 745 as described with reference to FIG. 7.

At 1015, the method may include generating, using a generator function of a first machine learning model, a set of sample data from an output of the first machine learning model that is configured to mimic the set of API responses when given the set of API requests. The operations of 1015 may be performed in accordance with examples as disclosed herein. In some examples, aspects of the operations of 1015 may be performed by a generator component 730 as described with reference to FIG. 7.

At 1020, the method may include weighting one or more parameters of a GAN based on a comparison, using a discriminator function of a second machine learning model, of the set of sample data with the set of API requests and the set of API responses, where the GAN includes the first machine learning model and the second machine learning model. The operations of 1020 may be performed in accordance with examples as disclosed herein. In some examples, aspects of the operations of 1020 may be performed by a discriminator component 735 as described with reference to FIG. 7.

At 1025, the method may include storing a trained version of the GAN based on the weighting. The operations of 1025 may be performed in accordance with examples as disclosed herein. In some examples, aspects of the operations of 1025 may be performed by a storage component 740 as described with reference to FIG. 7.

Figure 11:
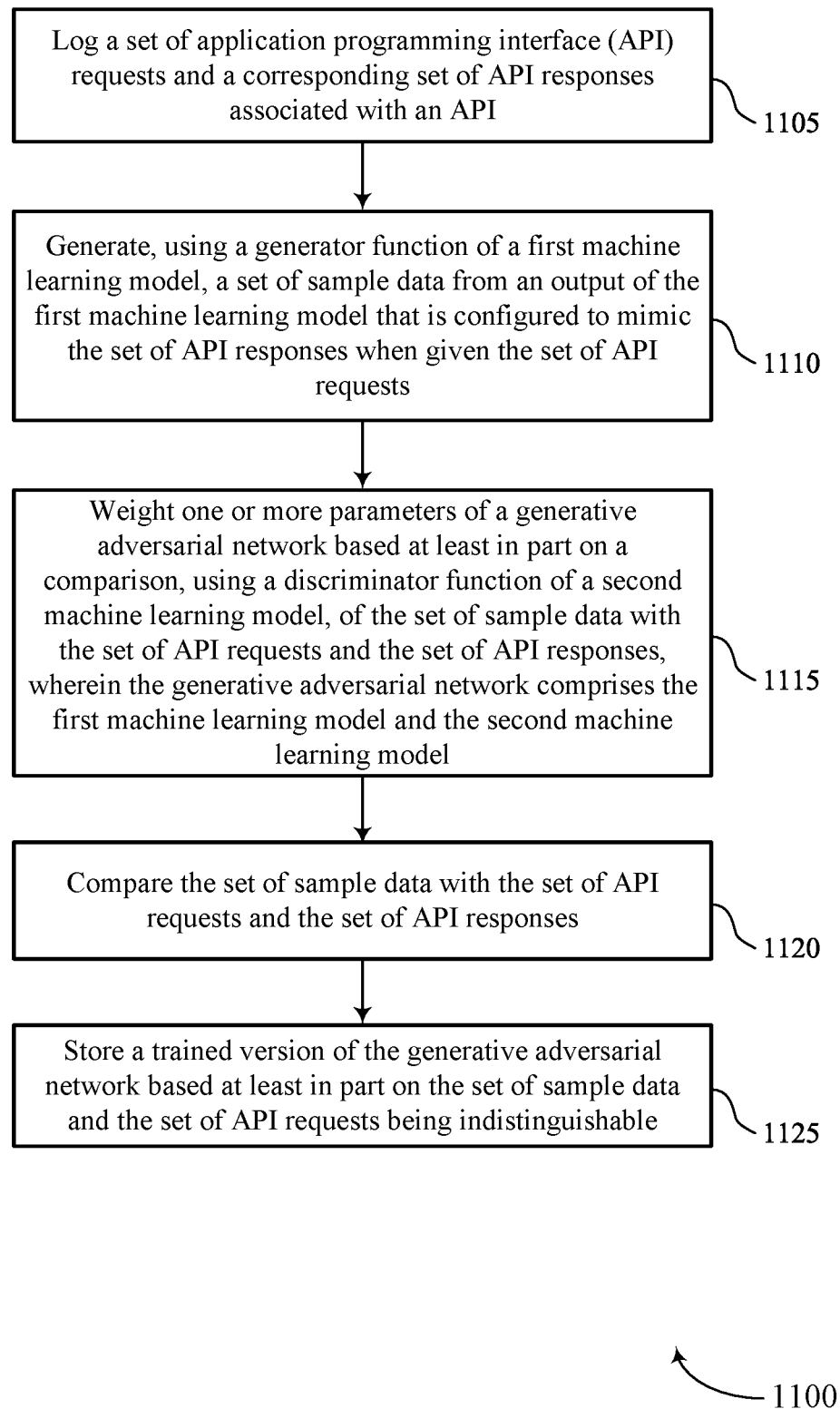

FIG. 11 shows a flowchart illustrating a method 1100 that supports sample data generation for a mocking service in accordance with aspects of the present disclosure. The operations of the method 1100 may be implemented by a mocking service or its components as described herein. For example, the operations of the method 1100 may be performed by a mocking service as described with reference to FIGS. 1 through 8. In some examples, a mocking service may execute a set of instructions to control the functional elements of the mocking service to perform the described functions. Additionally, or alternatively, the mocking service may perform aspects of the described functions using special-purpose hardware.

At 1105, the method may include logging a set of API requests and a corresponding set of API responses associated with an API. The operations of 1105 may be performed in accordance with examples as disclosed herein. In some examples, aspects of the operations of 1105 may be performed by a logging component 725 as described with reference to FIG. 7.

At 1110, the method may include generating, using a generator function of a first machine learning model, a set of sample data from an output of the first machine learning model that is configured to mimic the set of API responses when given the set of API requests. The operations of 1110 may be performed in accordance with examples as disclosed herein. In some examples, aspects of the operations of 1110 may be performed by a generator component 730 as described with reference to FIG. 7.

At 1115, the method may include weighting one or more parameters of a GAN based on a comparison, using a discriminator function of a second machine learning model, of the set of sample data with the set of API requests and the set of API responses, where the GAN includes the first machine learning model and the second machine learning model. The operations of 1115 may be performed in accordance with examples as disclosed herein. In some examples, aspects of the operations of 1115 may be performed by a discriminator component 735 as described with reference to FIG. 7.

At 1120, the method may include comparing the set of sample data with the set of API requests and the set of API responses. The operations of 1120 may be performed in accordance with examples as disclosed herein. In some examples, aspects of the operations of 1120 may be performed by a comparison component 750 as described with reference to FIG. 7.

At 1125, the method may include storing a trained version of the GAN based on the set of sample data and the set of API responses being indistinguishable. The operations of 1125 may be performed in accordance with examples as disclosed herein. In some examples, aspects of the operations of 1125 may be performed by a storage component 740 as described with reference to FIG. 7.

Figure 12:
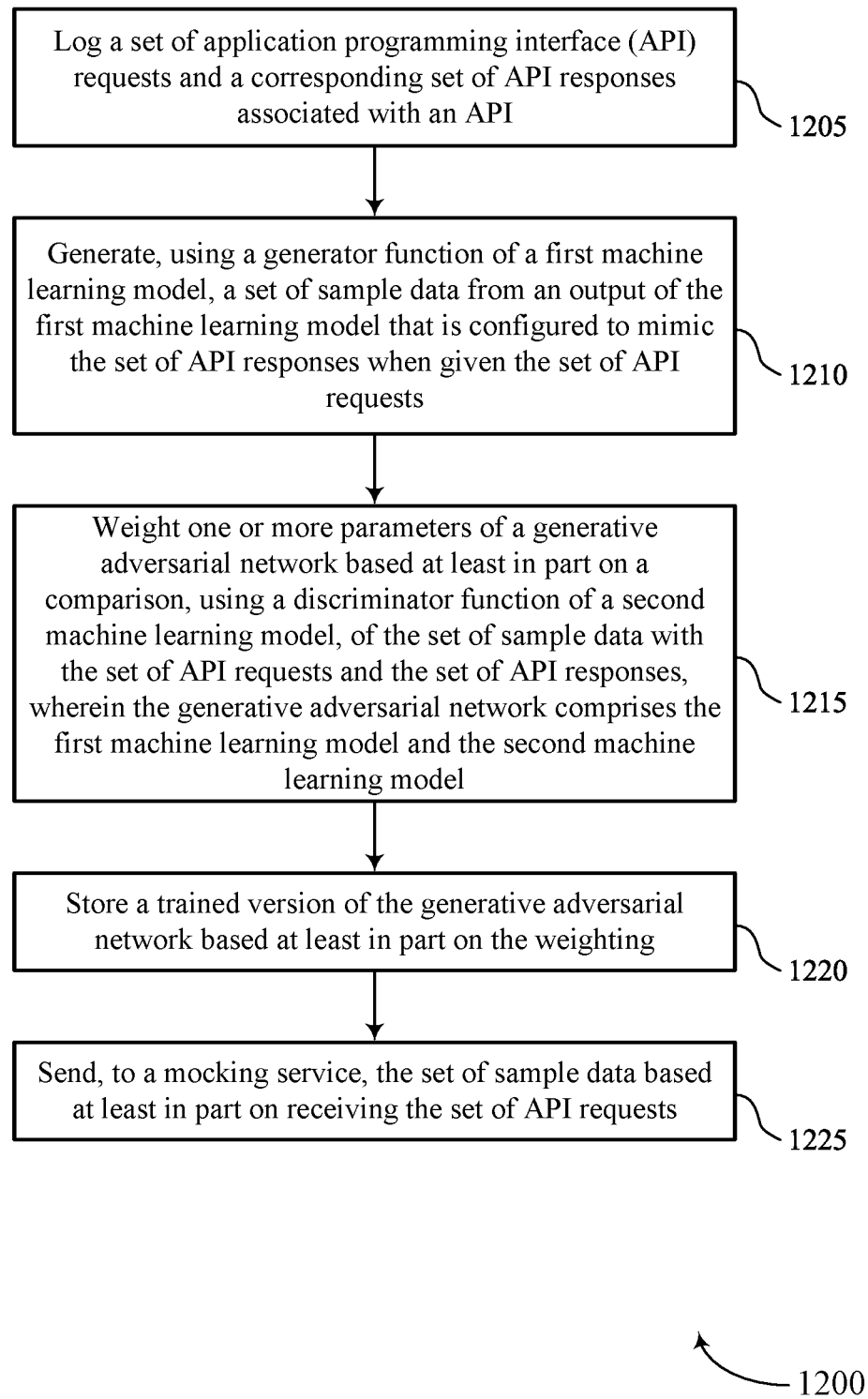

FIG. 12 shows a flowchart illustrating a method 1200 that supports sample data generation for a mocking service in accordance with aspects of the present disclosure. The operations of the method 1200 may be implemented by a mocking service or its components as described herein. For example, the operations of the method 1200 may be performed by a mocking service as described with reference to FIGS. 1 through 8. In some examples, a mocking service may execute a set of instructions to control the functional elements of the mocking service to perform the described functions. Additionally, or alternatively, the mocking service may perform aspects of the described functions using special-purpose hardware.

At 1205, the method may include logging a set of API requests and a corresponding set of API responses associated with an API. The operations of 1205 may be performed in accordance with examples as disclosed herein. In some examples, aspects of the operations of 1205 may be performed by a logging component 725 as described with reference to FIG. 7.

At 1210, the method may include generating, using a generator function of a first machine learning model, a set of sample data from an output of the first machine learning model that is configured to mimic the set of API responses when given the set of API requests. The operations of 1210 may be performed in accordance with examples as disclosed herein. In some examples, aspects of the operations of 1210 may be performed by a generator component 730 as described with reference to FIG. 7.

At 1215, the method may include weighting one or more parameters of a GAN based on a comparison, using a discriminator function of a second machine learning model, of the set of sample data with the set of API requests and the set of API responses, where the GAN includes the first machine learning model and the second machine learning model. The operations of 1215 may be performed in accordance with examples as disclosed herein. In some examples, aspects of the operations of 1215 may be performed by a discriminator component 735 as described with reference to FIG. 7.

At 1220, the method may include storing a trained version of the GAN based on the weighting. The operations of 1220 may be performed in accordance with examples as disclosed herein. In some examples, aspects of the operations of 1220 may be performed by a storage component 740 as described with reference to FIG. 7.

At 1225, the method may include sending, to a mocking service, the set of sample data based on receiving the set of API requests. The operations of 1225 may be performed in accordance with examples as disclosed herein. In some examples, aspects of the operations of 1225 may be performed by a sample data component 755 as described with reference to FIG. 7.

A method for data processing is described. The method may include logging a set of API requests and a corresponding set of API responses associated with an API, generating, using a generator function of a first machine learning model, a set of sample data from an output of the first machine learning model that is configured to mimic the set of API responses when given the set of API requests, weighting one or more parameters of a GAN based on a comparison, using a discriminator function of a second machine learning model, of the set of sample data with the set of API requests and the set of API responses, where the GAN includes the first machine learning model and the second machine learning model, and storing a trained version of the GAN based on the weighting.

An apparatus for data processing is described. The apparatus may include a processor, memory coupled with the processor, and instructions stored in the memory. The instructions may be executable by the processor to cause the apparatus to log a set of API requests and a corresponding set of API responses associated with an API, generate, using a generator function of a first machine learning model, a set of sample data from an output of the first machine learning model that is configured to mimic the set of API responses when given the set of API requests, weight one or more parameters of a GAN based on a comparison, using a discriminator function of a second machine learning model, of the set of sample data with the set of API requests and the set of API responses, where the GAN includes the first machine learning model and the second machine learning model, and store a trained version of the GAN based on the weighting.

Another apparatus for data processing is described. The apparatus may include means for logging a set of API requests and a corresponding set of API responses associated with an API, means for generating, using a generator function of a first machine learning model, a set of sample data from an output of the first machine learning model that is configured to mimic the set of API responses when given the set of API requests, means for weighting one or more parameters of a GAN based on a comparison, using a discriminator function of a second machine learning model, of the set of sample data with the set of API requests and the set of API responses, where the GAN includes the first machine learning model and the second machine learning model, and means for storing a trained version of the GAN based on the weighting.

A non-transitory computer-readable medium storing code for data processing is described. The code may include instructions executable by a processor to log a set of API requests and a corresponding set of API responses associated with an API, generate, using a generator function of a first machine learning model, a set of sample data from an output of the first machine learning model that is configured to mimic the set of API responses when given the set of API requests, weight one or more parameters of a GAN based on a comparison, using a discriminator function of a second machine learning model, of the set of sample data with the set of API requests and the set of API responses, where the GAN includes the first machine learning model and the second machine learning model, and store a trained version of the GAN based on the weighting.

In some examples of the method, apparatuses, and non-transitory computer-readable medium described herein, logging the set of API requests and the set of API responses may include operations, features, means, or instructions for generating a table including the set of API responses and a set of API request parameters, where a set of multiple columns of the table include the set of API request parameters and a set of fields associated with the set of API responses, and where a set of multiple rows of the table include values of respective fields corresponding to the set of API requests and the set of API responses.

Some examples of the method, apparatuses, and non-transitory computer-readable medium described herein may further include operations, features, means, or instructions for generating the set of sample data from the output of the generator function based on training the GAN with the table.

Some examples of the method, apparatuses, and non-transitory computer-readable medium described herein may further include operations, features, means, or instructions for comparing the set of sample data with the set of API requests and the set of API responses, where storing the trained version of the GAN may be based on the set of sample data and the set of API responses being indistinguishable.

Some examples of the method, apparatuses, and non-transitory computer-readable medium described herein may further include operations, features, means, or instructions for retrieving the trained version of the GAN from storage and generating the set of sample data based on retrieving the trained version of the GAN.

Some examples of the method, apparatuses, and non-transitory computer-readable medium described herein may further include operations, features, means, or instructions for sending, to a mocking service, the set of sample data based on receiving the set of API requests.

Some examples of the method, apparatuses, and non-transitory computer-readable medium described herein may further include operations, features, means, or instructions for anonymize the set of sample data with a set of random data from a mock library based on the set of sample data including PII.

Some examples of the method, apparatuses, and non-transitory computer-readable medium described herein may further include operations, features, means, or instructions for logging an updated set of API requests and a corresponding updated set of API responses associated with the API and reweighting the one or more parameters of the GAN based on the updated set of API requests and the updated set of API responses.

In some examples of the method, apparatuses, and non-transitory computer-readable medium described herein, a first set of fields associated with the set of sample data corresponds to a second set of fields associated with the set of API requests and the set of API responses.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   logging a set of application programming interface (API) requests and a corresponding set of API responses associated with an API;
   generating, using a generator function of a first machine learning model, a set of sample data from an output of the first machine learning model that is configured to mimic the set of API responses when given the set of API requests;
   weighting one or more parameters of a generative adversarial network based at least in part on a comparison, using a discriminator function of a second machine learning model, of the set of sample data with the set of API requests and the set of API responses, wherein the generative adversarial network comprises the first machine learning model and the second machine learning model; and
   storing a trained version of the generative adversarial network based at least in part on the weighting.

2. The method of claim 1, wherein logging the set of API requests and the set of API responses comprises:
   generating a table comprising the set of API responses and a set of API request parameters, wherein a plurality of columns of the table comprise the set of API request parameters and a set of fields associated with the set of API responses, and wherein a plurality of rows of the table comprise values of respective fields corresponding to the set of API requests and the set of API responses.

3. The method of claim 2, further comprising:
   generating the set of sample data from the output of the generator function based at least in part on training the generative adversarial network with the table.

4. The method of claim 1, further comprising:
   comparing the set of sample data with the set of API requests and the set of API responses, wherein storing the trained version of the generative adversarial network is based at least in part on the set of sample data and the set of API responses being indistinguishable.

5. The method of claim 1, further comprising:
   retrieving the trained version of the generative adversarial network from storage; and
   generating the set of sample data based at least in part on retrieving the trained version of the generative adversarial network.

6. The method of claim 1, further comprising:
   sending, to a mocking service, the set of sample data based at least in part on receiving the set of API requests.

7. The method of claim 1, further comprising:
   anonymizing the set of sample data with a set of random data from a mock library based at least in part on the set of sample data comprising personal identification information.

8. The method of claim 1, further comprising:
   logging an updated set of API requests and a corresponding updated set of API responses associated with the API; and
   reweighting the one or more parameters of the generative adversarial network based at least in part on the updated set of API requests and the updated set of API responses.

9. The method of claim 1, wherein a first set of fields associated with the set of sample data corresponds to a second set of fields associated with the set of API requests and the set of API responses.

10. An apparatus for data processing, comprising:
    a processor;
    memory coupled with the processor; and
    instructions stored in the memory and executable by the processor to cause the apparatus to:
    log a set of application programming interface (API) requests and a corresponding set of API responses associated with an API;
    generate, using a generator function of a first machine learning model, a set of sample data from an output of the first machine learning model that is configured to mimic the set of API responses when given the set of API requests;
    weight one or more parameters of a generative adversarial network based at least in part on a comparison, using a discriminator function of a second machine learning model, of the set of sample data with the set of API requests and the set of API responses, wherein the generative adversarial network comprises the first machine learning model and the second machine learning model; and
    store a trained version of the generative adversarial network based at least in part on the weighting.

11. The apparatus of claim 10, wherein the instructions to log the set of API requests and the set of API responses are executable by the processor to cause the apparatus to:
    generate a table comprising the set of API responses and a set of API request parameters, wherein a plurality of columns of the table comprise the set of API request parameters and a set of fields associated with the set of API responses, and wherein a plurality of rows of the table comprise values of respective fields corresponding to the set of API requests and the set of API responses.

12. The apparatus of claim 11, wherein the instructions are further executable by the processor to cause the apparatus to:
generate the set of sample data from the output of the generator function based at least in part on training the generative adversarial network with the table.

13. The apparatus of claim 10, wherein the instructions are further executable by the processor to cause the apparatus to:
compare the set of sample data with the set of API requests and the set of API responses, wherein storing the trained version of the generative adversarial network is based at least in part on the set of sample data and the set of API responses being indistinguishable.

14. The apparatus of claim 10, wherein the instructions are further executable by the processor to cause the apparatus to:
retrieve the trained version of the generative adversarial network from storage; and
generate the set of sample data based at least in part on retrieving the trained version of the generative adversarial network.

15. The apparatus of claim 10, wherein the instructions are further executable by the processor to cause the apparatus to:
send, to a mocking service, the set of sample data based at least in part on receiving the set of API requests.

16. The apparatus of claim 10, wherein the instructions are further executable by the processor to cause the apparatus to:
anonymize the set of sample data with a set of random data from a mock library based at least in part on the set of sample data comprising personal identification information.

17. The apparatus of claim 10, wherein the instructions are further executable by the processor to cause the apparatus to:
log an updated set of API requests and a corresponding updated set of API responses associated with the API; and
reweight the one or more parameters of the generative adversarial network based at least in part on the updated set of API requests and the updated set of API responses.

18. The apparatus of claim 10, wherein a first set of fields associated with the set of sample data corresponds to a second set of fields associated with the set of API requests and the set of API responses.

19. A non-transitory computer-readable medium storing code for data processing, the code comprising instructions executable by a processor to:
log a set of application programming interface (API) requests and a corresponding set of API responses associated with an API;
generate, using a generator function of a first machine learning model, a set of sample data from an output of the first machine learning model that is configured to mimic the set of API responses when given the set of API requests;
weight one or more parameters of a generative adversarial network based at least in part on a comparison, using a discriminator function of a second machine learning model, of the set of sample data with the set of API requests and the set of API responses, wherein the generative adversarial network comprises the first machine learning model and the second machine learning model; and
store a trained version of the generative adversarial network based at least in part on the weighting.

20. The non-transitory computer-readable medium of claim 19, wherein the instructions to log the set of API requests and the set of API responses are executable by the processor to:
generate a table comprising the set of API responses and a set of API request parameters, wherein a plurality of columns of the table comprise the set of API request parameters and a set of fields associated with the set of API responses, and wherein a plurality of rows of the table comprise values of respective fields corresponding to the set of API requests and the set of API responses.

* * * * *